United States Patent
Sandke et al.

(10) Patent No.: US 10,009,362 B2
(45) Date of Patent: *Jun. 26, 2018

(54) SYSTEMS AND METHODS FOR TARGETED ATTACK PROTECTION USING PREDICTIVE SANDBOXING

(71) Applicant: Proofpoint, Inc., Sunnyvale, CA (US)

(72) Inventors: Steven Robert Sandke, Cupertino, CA (US); Bryan Burns, Portland, OR (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/667,430

(22) Filed: Aug. 2, 2017

(65) Prior Publication Data

US 2017/0331843 A1    Nov. 16, 2017

Related U.S. Application Data

(63) Continuation of application No. 15/418,357, filed on Jan. 27, 2017, now Pat. No. 9,762,609, which is a
(Continued)

(51) Int. Cl.
*H04L 29/06* (2006.01)
*G06F 21/53* (2013.01)

(52) U.S. Cl.
CPC .......... *H04L 63/1416* (2013.01); *G06F 21/53* (2013.01); *H04L 63/101* (2013.01)

(58) Field of Classification Search
CPC .................................................. H04L 63/1466
(Continued)

(56) References Cited

U.S. PATENT DOCUMENTS 7,516,488 B1    4/2009  Kienzle et al.
7,854,001 B1    12/2010 Chen et al.
(Continued)

FOREIGN PATENT DOCUMENTS

EP    1801745 A1    6/2007
EP    2326057 A1    5/2011
(Continued)

OTHER PUBLICATIONS

Non-Final Office Action, dated Aug. 29, 2012, U.S. Appl. No. 13/491,494, filed Jun. 7, 2012.
(Continued)

*Primary Examiner* — Longbit Chai
(74) *Attorney, Agent, or Firm* — Carr & Ferrell LLP

(57) ABSTRACT

Provided herein are systems and methods for targeted attack protection using predictive sandboxing. In exemplary embodiments, a method includes retrieving a URL from a message of a user and performing a preliminary determination to see if the URL can be discarded if it is not a candidate for sandboxing. The exemplary method includes computing a plurality of selection criteria factors for the URL if the URL passes the preliminary determination, each selection criteria factor having a respective factor threshold. The method can further include determining if any of the selection criteria factors for the URL exceeds the respective factor threshold for the respective selection criteria factor. Based on the determining, if any of the selection criteria factors exceeds the factor threshold for the selection criteria factor, the exemplary method includes automatically placing the URL in a sandbox for analysis.

21 Claims, 9 Drawing Sheets

Related U.S. Application Data continuation of application No. 14/625,240, filed on Feb. 18, 2015, now Pat. No. 9,596,264.

(60) Provisional application No. 61/941,407, filed on Feb. 18, 2014.

(58) Field of Classification Search
USPC .......................................................... 726/23
See application file for complete search history.

(56) References Cited

U.S. PATENT DOCUMENTS

| | | | |
|---|---|---|---|
| 8,479,286 B2 | 7/2013 | Dalcher et al. | |
| 8,544,086 B2* | 9/2013 | Field | G06F 21/562 726/22 |
| 8,677,487 B2* | 3/2014 | Balupari | G06F 21/552 726/22 |
| 8,839,401 B2 | 9/2014 | Starink et al. | |
| 9,241,009 B1 | 1/2016 | Starink et al. | |
| 9,596,264 B2 | 3/2017 | Sandke et al. | |
| 9,686,297 B2 | 6/2017 | Starink et al. | |
| 9,762,609 B2 | 9/2017 | Sandke et al. | |
| 2006/0021031 A1 | 1/2006 | Leahy et al. | |
| 2006/0095955 A1 | 5/2006 | Vong | |
| 2006/0101120 A1 | 5/2006 | Helsper et al. | |
| 2006/0101334 A1 | 5/2006 | Liao et al. | |
| 2006/0129644 A1 | 6/2006 | Owen et al. | |
| 2006/0251068 A1 | 11/2006 | Judge et al. | |
| 2007/0136279 A1 | 6/2007 | Zhou et al. | |
| 2007/0136806 A1 | 6/2007 | Berman | |
| 2008/0133540 A1 | 6/2008 | Hubbard et al. | |
| 2008/0256187 A1 | 10/2008 | Kay | |
| 2009/0064330 A1 | 3/2009 | Shraim et al. | |
| 2009/0089857 A1 | 4/2009 | Sabin et al. | |
| 2009/0328216 A1 | 12/2009 | Rafalovich et al. | |
| 2010/0082979 A1 | 4/2010 | Edwards | |
| 2010/0154059 A1 | 6/2010 | McNamee et al. | |
| 2010/0192224 A1 | 7/2010 | Ferri et al. | |
| 2010/0318642 A1 | 12/2010 | Dozier | |
| 2011/0314546 A1 | 12/2011 | Aziz et al. | |
| 2012/0030302 A1 | 2/2012 | Lund et al. | |
| 2012/0047577 A1 | 2/2012 | Costinsky | |
| 2012/0060221 A1 | 3/2012 | Gerber et al. | |
| 2012/0079596 A1 | 3/2012 | Thomas et al. | |
| 2012/0102545 A1 | 4/2012 | Carter, et al. | |
| 2012/0151585 A1 | 6/2012 | Lamastra et al. | |
| 2013/0097699 A1 | 4/2013 | Balupari et al. | |
| 2013/0298240 A1 | 11/2013 | Gerber et al. | |
| 2013/0333026 A1 | 12/2013 | Starink et al. | |
| 2014/0181216 A1 | 6/2014 | Liebmann et al. | |
| 2014/0201126 A1 | 7/2014 | Zadeh et al. | |
| 2014/0259158 A1 | 9/2014 | Brown et al. | |
| 2015/0237068 A1 | 8/2015 | Sandke et al. | |
| 2015/0381653 A1 | 12/2015 | Starink et al. | |
| 2016/0036833 A1* | 2/2016 | Ardeli | H04L 63/101 726/22 |
| 2016/0127399 A1 | 5/2016 | Starink et al. | |
| 2017/0142150 A1 | 5/2017 | Sandke et al. | |

FOREIGN PATENT DOCUMENTS

| | | |
|---|---|---|
| EP | 2859495 | 4/2015 |
| EP | 3108395 | 12/2016 |
| EP | 3195140 | 7/2017 |
| TW | 201004264 A | 1/2010 |
| TW | I348122 | 9/2011 |
| TW | 201414260 | 4/2014 |
| WO | WO2006136605 A1 | 12/2006 |
| WO | WO2013184529 | 12/2013 |
| WO | WO2015126924 | 8/2015 |
| WO | WO2016044065 | 3/2016 |

OTHER PUBLICATIONS

Final Office Action, dated Jan. 9, 2013, U.S. Appl. No. 13/491,494, filed Jun. 7, 2012.
Non-Final Office Action, dated May 8, 2013, U.S. Appl. No. 13/491,494, filed Jun. 7, 2012.
Final Office Action, dated Sep. 4, 2013, U.S. Appl. No. 13/491,494, filed Jun. 7, 2012.
Notice of Allowance, dated May 8, 2014, U.S. Appl. No. 13/491,494, filed Jun. 7, 2012.
Notice of Allowance, dated Aug. 27, 2015, U.S. Appl. No. 14/486,990, filed Sep. 15, 2014.
Notice-Final Office Action, dated May 5, 2016, U.S. Appl. No. 14/625,240, filed Feb. 18, 2015.
Non-Final Office Action, dated Jul. 26, 2016, U.S. Appl. No. 14/993,043, filed Jan. 11, 2016.
Final Office Action, dated Aug. 17, 2016, U.S. Appl. No. 14/625,240, filed Feb. 18, 2015.
Advisory Action, dated Nov. 3, 2016, U.S. Appl. No. 14/625,240, filed Feb. 18, 2015.
Notice of Allowance, dated Jan. 3, 2017, U.S. Appl. No. 14/625,240, filed Feb. 18, 2015.
Notice of Allowance, dated Jan. 30, 2017, U.S. Appl. No. 14/993,043, filed Jan. 11, 2016.
Notice of Allowance, dated Jul. 14, 2017, U.S. Appl. No. 15/418,357, filed Jan. 27, 2017.
International Search Report and Written Opinion dated Jan. 3, 2014 in Patent Cooperation Treaty Application No. PCT/US2013/043790, filed May 31, 2013, 11 pages.
International Search Report and Written Opinion dated May 22, 2015 in Patent Cooperation Treaty Application No. PCT/US2015/016351, filed Feb. 18, 2015, 9 pages.
Proofpoint. Proofpoint Targeted Attack Protection. 2013 [retrieved on Apr. 22, 2015]. Retrieved from the internet: <URL:https://www.proofpoint.com/sites/default/files/documents/bnt_download/proofpoint-targeted-attack-protection-ds.pdf, 2 pages.
International Search Report and Written Opinion dated Dec. 17, 2015 in Patent Cooperation Treaty Application No. PCT/US2015/049496, filed Sep. 10, 2015, 14 pages.
Extended European Search Report dated Dec. 23, 2015 in European Patent Application No. 13800202.7 filed May 31, 2013, 8 pages.
Taiwan Patent Application No. 102120185, "Office Action," dated Dec. 1, 2016, 12 pages with Translation.
Taiwan Patent Application No. 102120185, "Notice of Allowance," dated Mar. 27, 2017, 3 pages.
"Extended European Search Report," European Patent Application No. 15752623.7, dated Jun. 23, 2017, 7 pages.
"Extended European Search Report," European Patent Application No. 15842030.7, dated Feb. 15, 2018, 7 pages.

* cited by examiner

SYSTEMS AND METHODS FOR TARGETED ATTACK PROTECTION USING PREDICTIVE SANDBOXING

CROSS-REFERENCE TO RELATED APPLICATIONS

This application is a continuation of U.S. application Ser. No. 15/418,357, filed Jan. 27, 2017 (issued as U.S. Pat. No. 9,762,609 on Sep. 12, 2017), which is a continuation of U.S. application Ser. No. 14/625,240, filed Feb. 18, 2015 (issued as U.S. Pat. No. 9,596,264 on Mar. 14, 2017), which claims the benefit of U.S. Provisional Application No. 61/941,407, filed Feb. 18, 2014, which are hereby incorporated by reference herein in their entirety, including all references cited therein.

FIELD

The present technology pertains to data security, and more specifically, but not by limitation, to systems and methods that employ predictive sandboxing regarding testing URLs ("Uniform Resource Locators") found in electronic messages for maliciousness.

SUMMARY

Various embodiments provide methods configured to process URLs using a multifaceted exclusionary process such that only relevant URLs are analyzed, so as to reduce analysis redundancy and improve process quality.

According to some embodiments, the present technology is directed to a method comprising: discarding a URL included in an electronic message if the URL is included in a uniform resource indicator (URI) blacklist, otherwise: discarding the URL if the URL has been sandboxed for analysis within a recent time period, otherwise: normalizing the URL to a domain name and resource, and discarding the URL if the domain name is in a domain name ignore list or a domain blacklist, otherwise: selectively placing the URL in a sandbox for analysis.

According to some embodiments, the present technology is directed to a method comprising: retrieving a URL from a message of a user; performing a preliminary determination to determine if the URL is not a candidate for sandboxing; computing a plurality of selection criteria factors for the URL, if the URL passes the preliminary determination, each selection criteria factor having a respective factor threshold; determining if any of the selection criteria factors for the URL exceeds the respective factor threshold for the respective selection criteria factor; and based on the determining, if any of the selection criteria factors exceeds the factor threshold for the selection criteria factor, automatically processing the URL using a sandbox.

According to some embodiments, the present technology is directed to a method comprising performing any combination of two or more of: discarding from sandboxing a URL included in an electronic message if the URL is included in a uniform resource indicator (URI) blacklist; discarding from sandboxing the URL if the URL has been sandboxed for analysis within a recent time period; discarding from sandboxing the URL if a normalized version of the URL has a domain name is in a domain ignore list or a domain blacklist; discarding from sandboxing the URL if a number of messages comprising the URL exceeds a message count threshold; discarding the URL if a count of messages comprising the URL and associated with the domain name exceeds a domain count threshold; and discarding from sandboxing the URL if a sandbox has received a number of URLs that meet a predetermined sandbox limit.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the disclosure, and explain various principles and advantages of those embodiments.

The methods and systems disclosed herein have been represented by appropriate conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
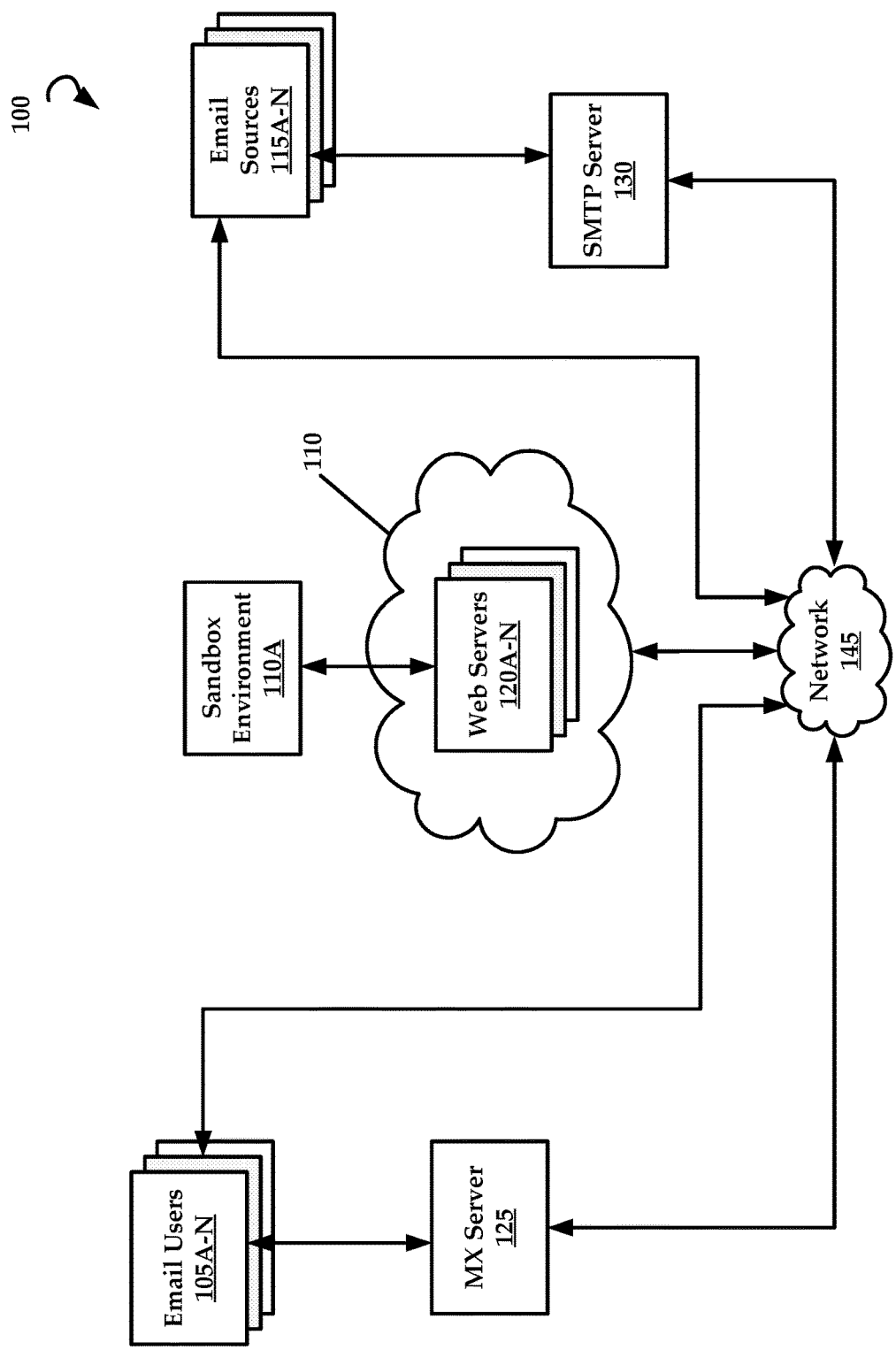
FIG. 1 is a schematic diagram of an example computing environment for practicing aspects of the present technology.

The present technology provides a data driven prediction and real-time scoring engine that utilizes statistical modeling to predict URL destinations likely to be malicious. These URL destinations are often part of an emerging attack. This predictive defense may incorporate "Big Data" techniques (but may apply equally well in "small data" situations) and apply machine-learning heuristics to determine, infer, and/or deduce suspicious email messages. The email processing method described herein can be executed on a per user, per group, per company, per vertical, per country, or other desired basis, and may be performed at cloud-level across all traffic as part of an email threat protection system such as a Targeted Attack Protection (TAP) system, which will be described in greater detail herein.

A protected user's (e.g., an email user who has emails that are being analyzed using the present technology) email patterns may be analyzed and used to build a behavioral history of that specific user and to determine which types of email are suspicious and require further scrutiny. Such analysis may be especially useful in detecting email attacks commonly referred to as spear-phishing, although other types of malicious email attacks, even email attacks of new and yet unseen methods, can be discovered using the present technology. Observation of normal mail flow characteristics for a user mailbox, and analysis of the inbound email in real-time, is used to identify anomalies, and thus influence the email threat protection system's actions around detection and protection from threats.

An email threat protection system of the present technology may use predictive sandboxing of URLs and/or domains to protect users from potentially malicious threats. The email threat protection system may build statistical models using email history, web traffic data ranking (e.g., from Alexa Internet, Inc., and so forth), Internet protocol (IP) block reputation, velocity (e.g., volume over time) of email sent from an originating IP, and as well as other criteria to build patterns. These patterns may be based on URLs observed in messages at a global level across organizations. With the help of real-time scoring against these statistical models to find patterns, the email threat protection system predicts which URLs are likely to be malicious. Using these predictions, the email threat protection system proactively sandboxes the destination URLs.

To be sure, sandboxing refers to any suitable method of analyzing a URL, domain, or web site in a controlled and/or isolated environment, separate from an end-user computer, system, device, or environment in order to prevent any potential malicious threats from infecting such end user's environment. By observing the behavior of the URL in a sandboxed environment, the email threat protection system learns about threats. The email threat protection system can also declare URLs and entire normalized patterns (as discussed below) as being malicious, thus reducing the time and effort required to stop the damage of campaigns.

The present technology allows for predictive determination of malicious emails, email attachments, and URLs. The email threat protection system can be configured to take preemptive steps before any user has a chance to click and have their machine compromised. For example, a preemptive step can include URL or domain condemnation/blacklisting, email message delivery delays, as well as other preemptive steps provided herein which are used to prevent the user from being affected by malware or malicious attack.

In various embodiments, systems and methods described below utilize preemptive sandboxing of URLs observed in an incoming email stream. The goal is to dramatically increase the detection of malicious URLs to prevent customer clicks on them.

Turning now to FIG. 1, the present technology can be implemented within an exemplary computing environment 100. Generally, the computing environment 100 comprises a plurality of email users 105A-N, an email threat protection system, hereinafter "system 110", and a plurality of email sources 115A-N. The email users 105A-N are recipients of email or other electronic messages that are transmitted by one or more of the plurality of email sources 115A-N. In some embodiments, some of email sources 115A-N may be malicious computing devices, or computing devices operated by fraudsters, or the like. The email sources 115A-N can also include computing devices that have been co-opted by malicious software and used to execute various malicious email attacks, such as spear-phishing or other similar attacks.

The computing environment 100 also comprises one or more email servers, such as a simple mail transfer protocol (SMTP) server 130 (typically associated with the email sources 115A-N), and mail exchange (MX) server 125 (typically associated with the email users 105A-N).

In some embodiments, the functionalities of the system 110, which are described in greater detail below, can be incorporated into any of the SMTP server 130 or the MX server 125. In other embodiments, the system 110 can be configured to intercept email messages before receipt by the SMTP server 130 from the email sources 115A-N, or after transmission of the email messages by the SMTP server 130.

In other embodiments, the system 110 can be configured to intercept email messages before receipt by the MX server 125. In yet other embodiments, the system 110 can be configured to intercept email messages before receipt by the email users 105A-N, but after transmission by the MX server 125.

In some embodiments, the MX server 125 can include, for example, an enterprise email server that transmits emails to the system 110 for processing, prior to delivery to individual corporate email users.

In other embodiments, the plurality of email users 105A-N are each communicatively couplable to the system 110 via a network 145. The network 145 may include private or public communication channels such as the Internet. Suitable networks may include, or interface with, any one or more of a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks; including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network.

As mentioned above, the system 110 can intercept messages, process the messages, and pass the email messages to the plurality of email users 105A-N if the email messages are determined to be safe (e.g., not including a malicious URL).

According to some embodiments, the system 110 may include a cloud based computing environment for threat analysis and detection system using data analytics. In general, a cloud-based computing environment is a resource that typically combines the computational power of a large grouping of processors and/or combines the storage capacity of a large grouping of computer memories or storage devices. For example: systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers such as web servers 120A-N with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

The system 110 may be generally described as a particular purpose computing environment that includes executable instructions that are configured to enhance threat analysis and detection, using predictive sandboxing of electronic message components, such as URLs.

Generally, the system 110 can be configured to receive email messages that include URL links embedded or otherwise included in the email messages. Thus, the system 110 is configured to determine the presence of a URL link in an email message. While a URL link has been disclosed, the present technology can be used to evaluate any similar link, such as a clickable email address or other clickable object that launches a program such as a web browser, an email program, or other similar resource.

For brevity and clarity of description, the following examples will detail the use of the present technology for processing email messages. Once email messages have been determined to include a URL link, the URL links are evaluated using various facets or features.

According to some embodiments, the system 110 is configured to provide the following non-limiting URL analysis features. One example feature includes the use of normalization techniques in order to normalize URLs by removing subdomains, query strings and anchors (e.g., http://www.foo.com/bar.html?q=1&x=y#123 is normalized to "http://foo.com/bar.html"). The extent to which a URL is normalized can be established by a system administrator. For example, URLs may be normalized by only removing subdomains, anchors, or other email attributes. Various permutations of email attributes can be removed as needed. In some embodiments, normalization is not required. Thus, normalization is a selectable feature that may not be required for every use.

In some embodiments, normalization techniques can be extended to different malicious email campaign types, and broaden the ability to condemn patterns of URLs rather than individual URLs. For example, the system 110 can be configured to recognize that the presence of the same subdomain in a URL is indicative of the URL being associated with a malicious resource. Thus, the system 110 can immediately condemn all URLs containing the subdomain.

To be sure, the term "condemn" as used throughout the description will be understood as the inclusion of a URL or portion of a URL, such as a domain name, in a URL blacklist resource, such as a uniform resource indicator (URI) black list. Other similar blacklisting or quarantining resources can also likewise be utilized to store information about a condemned URL.

Some malicious email campaigns randomize on subdomain, or page name, or subdirectory, and so forth. An entire domain or a page name associated with the domain name may be condemned to save time and resources that would be required to sandbox each subdomain/page name/subdirectory individually. Using such normalization techniques can be advantageous when processing very large numbers of email messages. For example, by normalizing URLs by removing subdomains, query strings and anchors, the number of URLs sandboxed by the system 110 may be reduced significantly (of course, dependent upon the specific body of data processed).

In some embodiments, the system 110 uses a domain or URL reputation database to identify potentially malicious URLs. To be sure, the system 110 may query the URL or domain against various third party resources that include reputation information. The sensitivity of the system 110 to certain reputation information can be selectively adjusted. For example, if the URL or domain has a very poor reputation, the URL or domain can be immediately condemned. If the URL or domain has a suspect reputation, but mixed opinions are present, the URL or domain may be further processed by the system 110. Thus, the presence of some degree of negative information about the URL or domain is not always entirely sufficient to deem the URL or domain as malicious enough to condemn, but the URL or domain may also not be worrisome enough to justify being placed in the sandbox. Thus, other tests may be performed on the URL or domain as described herein.

In some embodiments, the system 110 is configured to perform a URL validity check before sandboxing. Invalid URLs may be submitted for predictive sandboxing by the system 110 querying various sources such as web traffic data ranking websites. The system 110 may advantageously avoid sandboxing clearly invalid URLs. These invalid URLs can be condemned.

The system 110 can also be configured to grant priority to publishing normalized URLs over redundant URLs if, for example, a URL reputation database publications requests are throttled. This type of throttling can occur when too many requests for URL analysis are received by the reputation database. In some embodiments, the system 110 may build and utilizes an internal URL reputation database. In other embodiments, the system 110 can utilize a third party reputation database in addition to, or in place of, a local URL reputation database.

The system 110 comprises a sandbox environment 110A that comprises a virtual machine simulated environment for testing a URL to determine if the URL is malicious.

Figure 2:
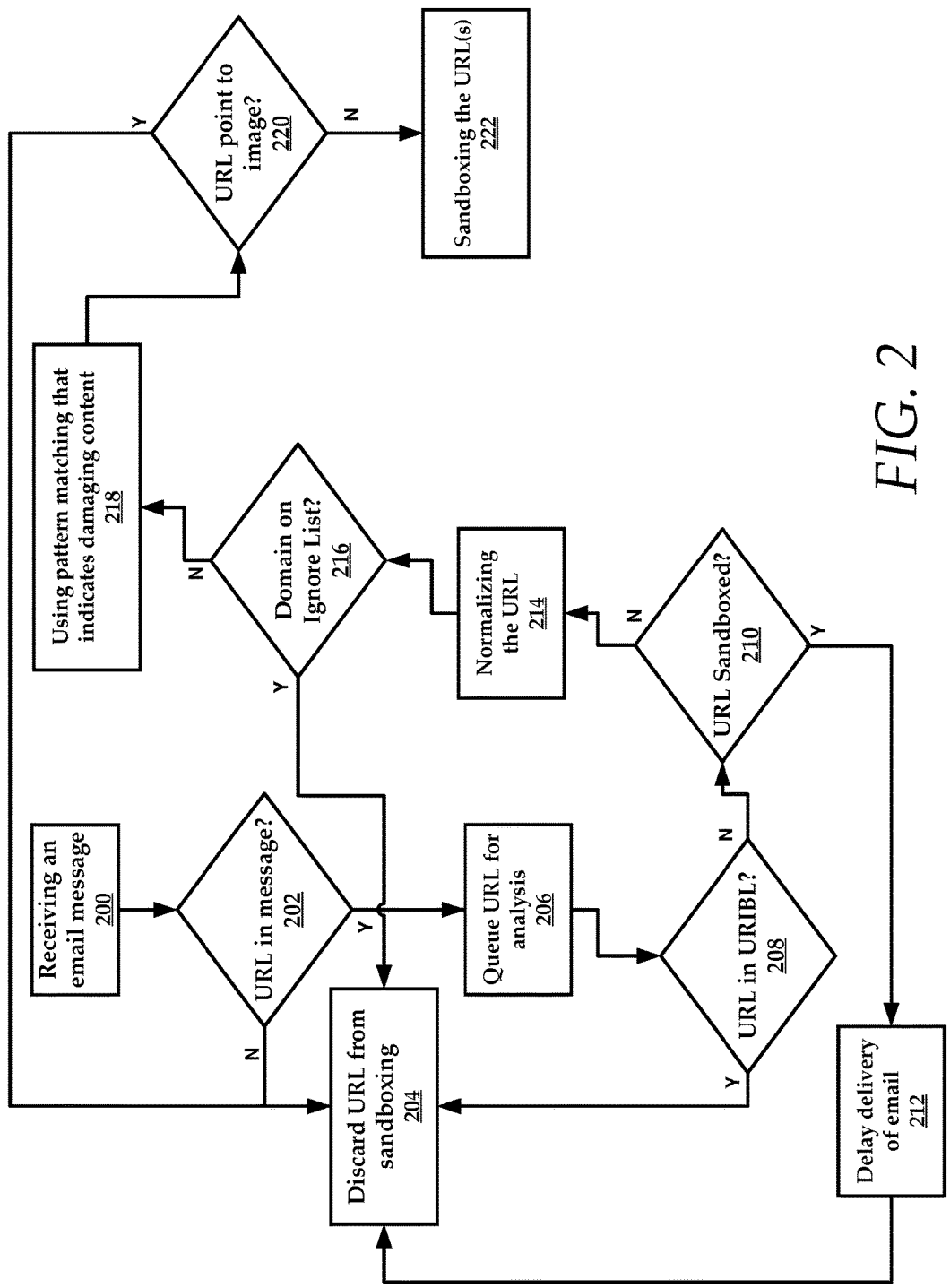
FIG. 2 is a decision tree showing an example predictive sandboxing method.

Referring now to FIG. 2, an exemplary method for processing emails in accordance with the present technology is described. In some embodiments, the method comprises, at 200, receiving an email message by the system 110. Again, the system 110 can receive emails from a variety of sources such as SMTP servers, enterprise email servers, and/or email user computing systems.

The method can include the system 110 evaluating, at 202, the email messages to determine if any of the email messages include a URL. If an email message does not include a URL (or other object that contains an HTML link, pointer to a website resource, or a link that launches a program), the method comprises discarding 204 the email message (e.g., discard from sandboxing).

If an email message does include a URL, the method includes queuing, at 206, the email message for analysis using a preemptive sandboxing process.

When a URL is received by the system 110, it may be processed as follows to determine if the URL should be preemptively sandboxed. According to some embodiments, the method comprises checking, at 208, the URL against a URI (uniform resource identifier) Black List ("URIBL"). If the URL is included in the URIBL, the method comprises discarding the email message as in step 204. To be sure, the URL can be queried against numerous URIBLs if desired.

Some of the steps of the method will involve the use of thresholds established within the system 110. These thresholds, such as a domain count threshold, a blacklisting threshold, a message count threshold, and a sandbox limit. These thresholds are generally referred to as a factor threshold.

If the URL is not included in a URIBL, the email message is further processed by determining, at 210, if the URL has been predictively sandboxed within a recent time period. By way of example, the system 110 can be configured with a recent time period such as an hour, a day, a week, a month, or any other time frame. To be sure, the exemplary system 110 maintains a database or list of each URL evaluated. The URLs can be stored in their original format or in a normalized format, as will be described in greater detail below.

In more detail, the method comprises the system 110 comparing each URL against the list/database of previously evaluated URLs. If the URL has been evaluated in the recent time period, the method includes the system 110 discarding the URL from further sandboxing as in step 204. To be sure, the discarding or excluding of the email message from consideration or sandboxing does not require or imply that the email message is deleted and/or not transmitted to the recipient. In some embodiments, the method comprises the system 110 delaying, at 212, delivery of the email message until the URL associated with the email message has been fully processed by the system 110 to determine if the URL is or is not associated with a malicious resource or malware.

Advantageously, the ability to exclude email messages from sandboxing if the URL has been recently sandboxed will improve system efficiency and increase the likelihood that URLs with malicious content will be discovered more rapidly as system resources can be dedicated to analysis of URLs that are likely to be associated with malicious content.

The method may further include the system 110 normalizing, at 214, the URL. The concept of URL normalization can be understood to include the reformatting or rewriting of a URL in a more concise manner. For example, one normalization technique is to remove subdomains, query strings and anchors. The URL http://www.foo.com/bar.html?q=1&x=y#123 is normalized to "http://foo.com/bar.html".

Normalization allows the system to determine resource specific information. For example, the system 110 can determine from sandboxing methods that any URL that points to a webpage that comprises a file name of "seeme.mp3" launches a malware attack against the end user. In another embodiment, the system can determine that any webpage or resource that emanates from www.foo.com (domain) includes malware. This domain level knowledge is improved by reducing URLs to basic domain name and/or resource information. The normalization process allows the system 110 to make broad decisions about a domain, which will allow the system 110 to quickly discard any future emails messages that have URLs that direct to that domain, without the need to sandbox each URL received from that domain.

In various methods, the method includes, at 216, the system 110 determining if the domain is in a list of domains to ignore. If so, the system discards the URL from sandboxing as in step 204. In an embodiment, the method includes the system 110 comparing the domain of the URL to domains in a domain name ignore list such as Alexa's™ Top 100 ignore list. Other similar domain ignore lists can be consulted by the system. In some embodiments, the system 110 can create and maintain its own list of domains. This list may be updated as data is accumulated about domains by the system 110.

For context, the domain ignore list can include domains that are considered safe and malware free. Thus, the system 110 can optimize its sandboxing procedures by ignoring safe domains.

In some embodiments, the method includes the system 110 using, at 218, email pattern matching to remove from consideration the sandboxing of URLs which indicate that the URL is likely to direct the user to damaging content. For example, an email pattern or behavior could include a URL link that would unsubscribe a recipient from a mailing list. Other email patterns may indicate that an email message includes a URL that is potentially malicious, and can likewise be utilized in accordance with the present technology. Email patterns may be based on URLs observed in messages at a global level across organizations.

According to some embodiments, the method includes the system 110 ignoring, at 220, the URL, if the URL is pointing to images or other non-threatening content that may prevent unnecessary sandboxing. For example, the system 110 can examine the URL for resource information such as file extensions of .jpg, .png, .tiff, .gif, and so forth.

For URLs that pass through one or more (or various combinations) of the above steps, the URLs can be further processed by executing one or more algorithms to further process the URLs prior to sandboxing.

If additional processing is not desired, the method can include sandboxing, at 222, URLs that remain after passing through steps 200-220, or any combination of steps 200-220.

Figure 3:
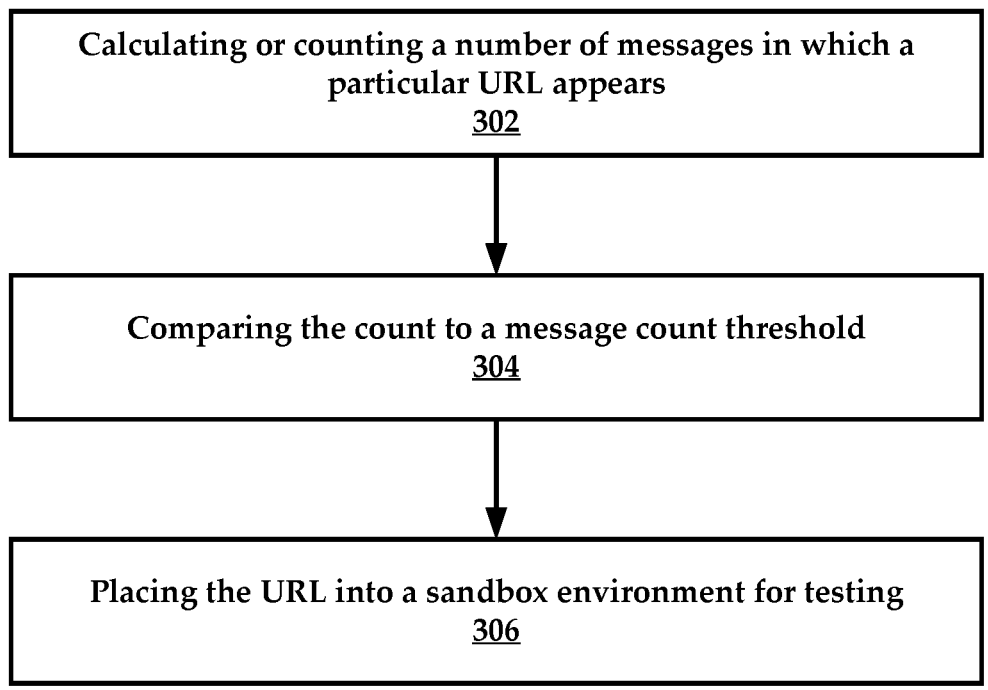
FIG. 3 is a flowchart of an example method for calculating and using a message count.

Turning to FIG. 3, an example processing algorithm includes the system 110 calculating, at 302, or counting a number of messages in which a particular URL appears. The method comprises comparing, at 304, the count to a message count threshold. For example, a message count threshold includes 25 messages. If the number of messages comprising the URL meets or exceeds the 25 message threshold, the method includes the system 110 placing, at 306, the URL into a sandbox environment for testing. To be sure, other example message count threshold values can be utilized.

In some embodiments, the system 110 can track each message with a unique identifier. According to some embodiments, the system 110 is configured to determine duplicate events and count numbers of these duplicate events. In other embodiments, the system 110 is configured to determine if the URL appears in a predetermined number of locations or is directed to a certain number of email users. Thus, the system 110 can be configured to track an aggregate number of email users that are targeted with the same URL.

In other embodiments, the method includes the system 110 determining (e.g., lookup/evaluate) the IP (Internet Protocol) reputation of the email sender. For example, an SMTP server associated with a domain is known for being used to execute malware attacks. The IP address of the SMTP server 130 may be identified as being used by malicious attackers. In another example, the reputation of the email sender (e.g., sending email party) can be determined by comparing the email address of the sender with one or more email address reputation databases or lists.

In some embodiments, a predetermined email threat protection threshold can be established for the system 110, e.g., based on historical data, system criticality, to name just a few. The threat protection score can be based on the URL criteria, such as how broadly the URL has been seen within a given timeframe, how many customers received this URL, IP reputation, Spam score, or other metadata. Those considerations may also be used in determining the associated predetermined threshold.

Figure 4:
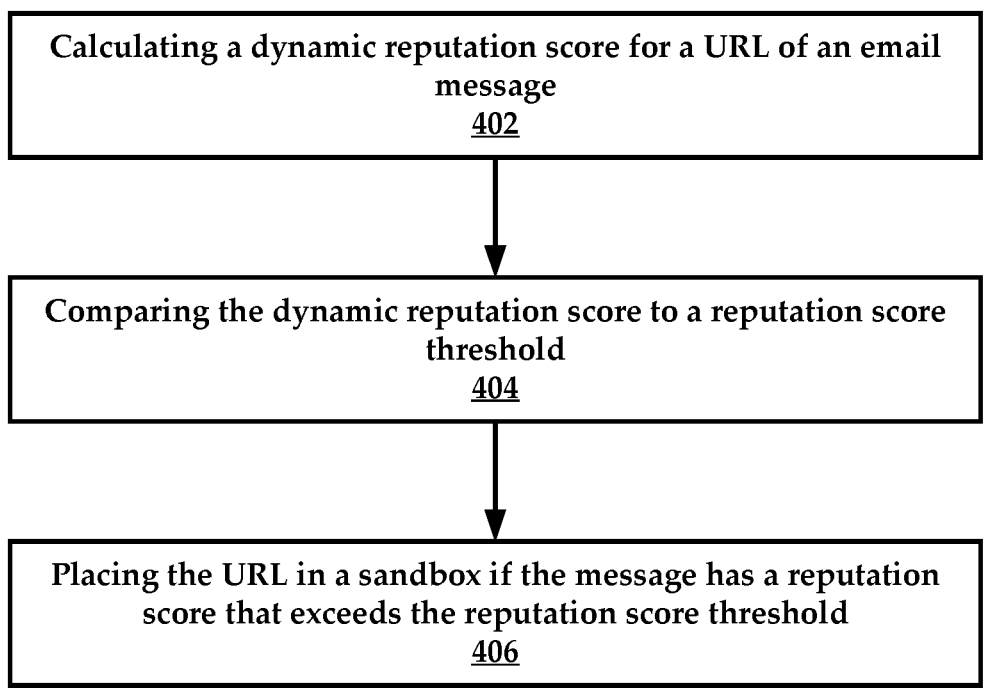
FIG. 4 is a flowchart of an example method for calculating and applying a dynamic reputation score for a URL.

FIG. 4 illustrates an example scoring algorithm that involves dynamic reputation values. The method comprises the system 110 calculating, at 402, a dynamic reputation score for a URL of an email message. The score may be based on how broadly the URL and/or domain has been seen within a given timeframe, how many customers received this URL, IP reputation, Spam score, or other metadata and historical data. Further details regarding exemplary reputation scores and the calculation thereof are found in commonly assigned U.S. patent application Ser. Nos. 14/486,990 and 13/491,494, which are incorporated by reference herein in its entirety.

Next, the method includes a step of the system 110 comparing, at 404, the dynamic reputation score to a reputation score threshold. The reputation score values can range between zero and one, with zero being an extremely poor reputation.

In some embodiments, the method includes placing, at 406, the URL in a sandbox if the message has a reputation score that exceeds the reputation score threshold.

Figure 5:
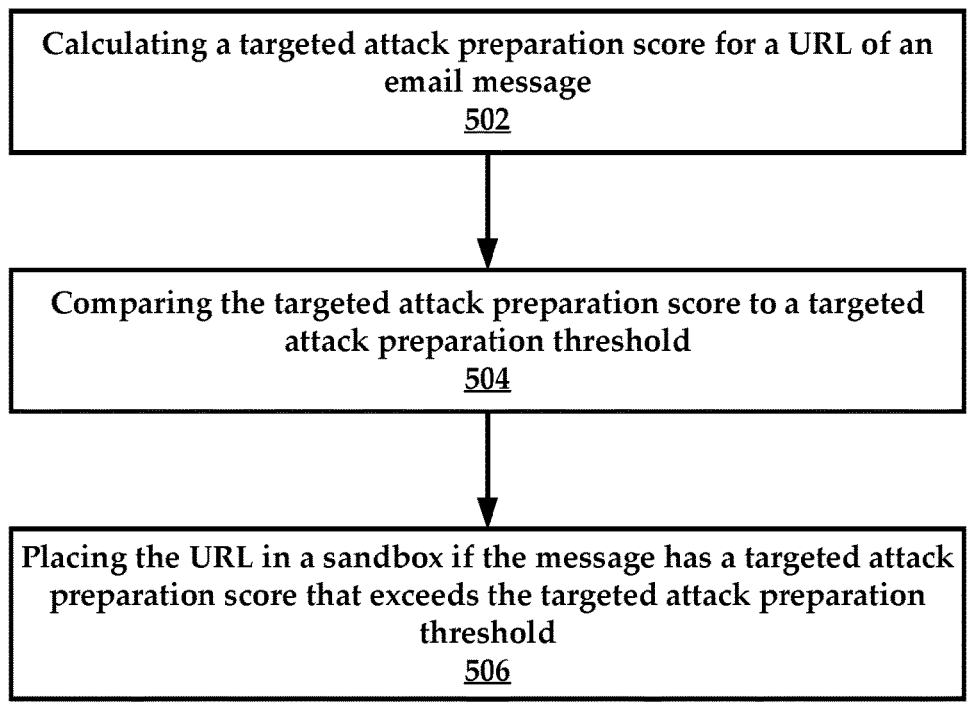
FIG. 5 is a flowchart of an example method for calculating and applying a targeted attack preparation score for a URL.

FIG. 5 illustrates an example scoring algorithm that involves a targeted attack preparation score. The method comprises the system 110 calculating, at 502, a targeted attack preparation score for a URL of an email message. The score may be based on various historical data, e.g., data relating to the URL and/or domain being used for spearphishing and other malicious attacks. Observation of normal mail flow characteristics for every user mailbox, and analysis of the inbound email in real-time may be used to identify anomalies and thus influence the targeted attack preparation score. Other factors that may be utilized in some embodiments include how broadly the URL and/or domain has been seen within a given timeframe, how many customers received this URL and/or domain, IP reputation, Spam score, or other metadata and historical data Further details regarding exemplary scores regarding the URLs of messages and the calculation thereof are found in commonly assigned U.S. patent application Ser. Nos. 14/486,990 and 13/491,494, which are incorporated by reference herein in its entirety.

Next, the method includes a step of the system 110 comparing, at 504, the targeted attack preparation score to a targeted attack preparation threshold. The targeted attack preparation score values can range between zero and one, with zero being very susceptible to a malicious attack, and one signifying very protected from potential attacks.

In some embodiments, the method includes placing, at 506, the URL in a sandbox if the message has a targeted attack preparation score that exceeds the targeted attack preparation threshold.

To be sure, URLs that meet a certain score(s) or criteria may be predictively sandboxed, meaning that the URL would be sandboxed automatically by the email threat protection system 110 without requiring a customer to access the URL.

In certain embodiments, the system can apply selection criteria for sandboxing a URL which requires a minimum average of targeted attack preparation scores and reputation scores In other embodiments, the system can apply selection criteria for sandboxing a URL such as minimum message counts and customer counts (e.g., number of customers receiving the same URL).

According to some embodiments, the number of URLs sandboxed from a given domain may be limited to prevent overloading from any specific domain. Other criteria for selecting whether to sandbox a URL could relate to the results of other URLs from the same domain that have been sandboxed (and the results thereof).

As mentioned above, the system 110 can be configured to count a number of URLs that have malicious content, that originate from the same domain. This process was described above with respect to normalization.

The system 110 may have a domain count threshold established that defines how many URLs for a domain can be analyzed within a given time, within the sandbox environment. If the domain count threshold is met, the system 110 can ignore any additional URLs for the given period of time.

In some embodiments, the system 110 can be configured to eliminate the domain count threshold if any of the URLs in the sandbox are malicious.

The system 110 can also reinstitute the domain count threshold for the domain name after the given period of time or after a set number of URLs associated with the domain name are found to be non-malicious.

In a further example, the system 110 can read a current count for a URL or domain. The system 110 then computes a current limit per domain. In one example, the system is configured with a predetermined value for the limit. In another example, the system 110 will decay the limit based on how close to the daily limit the number of predictive sandboxes performed is. To be sure, if the current count exceeds the limit, the URL may be discarded from sandboxing.

Again, if the system 110 determines that a set number of URLs associated with a single domain are malicious, the system 110 can condemn the domain to a URIBL or other exclusionary list. Stated otherwise, if a sufficient quantity of URLs for a normalized URL come back as malicious, the normalized URL may be condemned in the URIBL as well by the system 110.

To be sure, sandboxing of URLs can be resource intensive, and therefore it may be beneficial to prevent overloading of the sandbox by placing criteria such as total number of URLs processed in a give timeframe, number of URLs processed from a given location, or other such limiting criteria.

Figure 6:
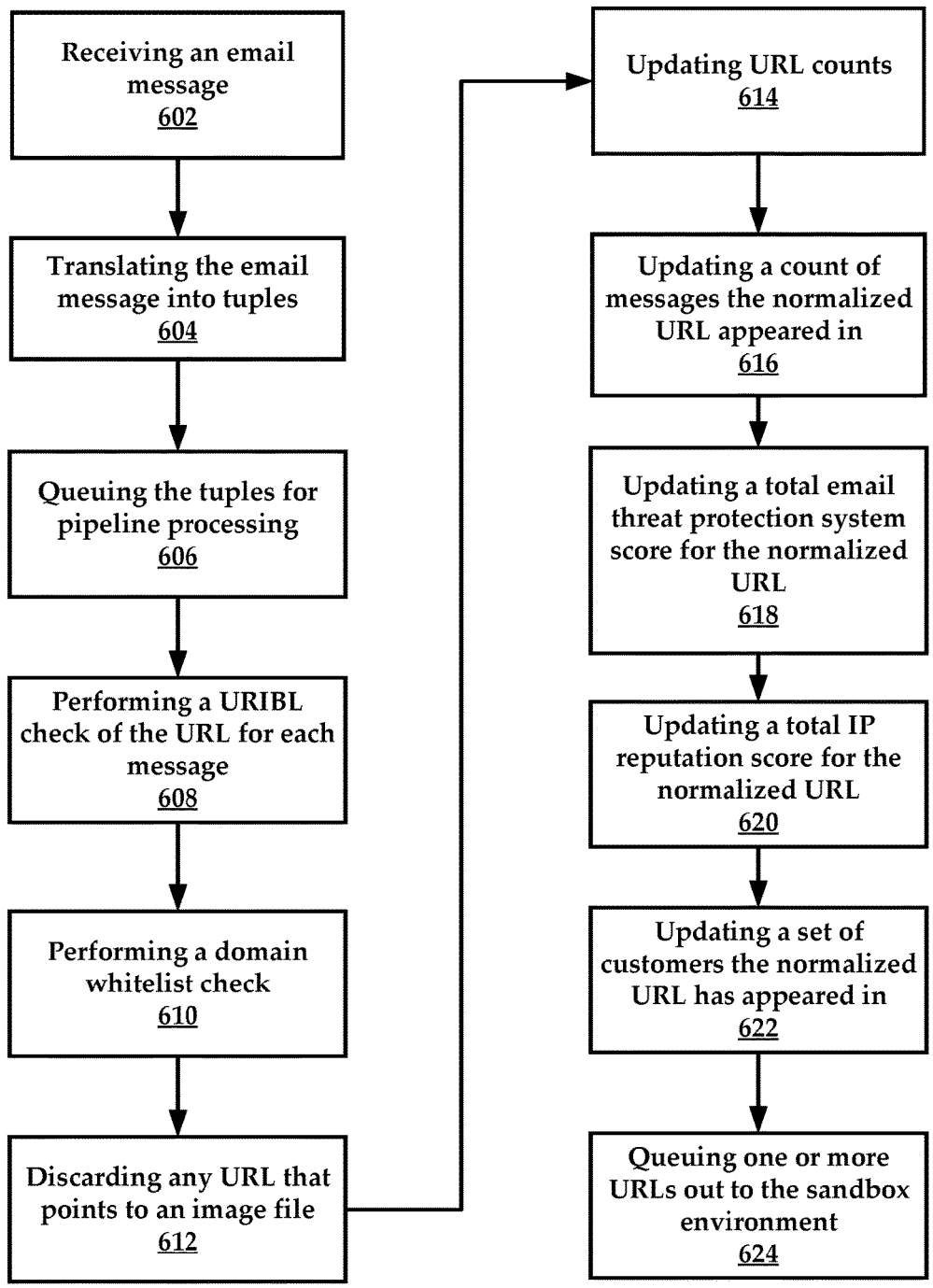
FIG. 6 is a flowchart of an example predictive sandboxing method.

The following paragraphs describe an exemplary process of email message and URL analysis. In some embodiments, a method for email message processing as illustrated in FIG. 6 comprises a step of receiving, at 602, an email message. Next, the method includes translating, at 604, the email message into tuples such as URL, normalized URL, normalized domain, message identifier, customer identifier, sender IP reputation score, threat protection score, and combinations thereof.

The method further comprises queuing, at 606, the tuples for pipeline processing. The pipeline processing method comprises performing, at 608, a URIBL check of the URL, as well as performing, at 610, a domain whitelist check where the normalized domain is checked against a set of whitelisted domains. In both the blacklist and whitelist check, the URL may be discarded from sandboxing if the URL is in either list.

In some embodiments, the normalized domain can be checked against a set of undesired domains that should not be accessed using a URL link. In some embodiments, normalization is applied to both URLs in the pipeline as well as the domains in the whitelist. Again, the URL can be discarded from sandboxing if present in the whitelist.

In some embodiments, the method includes discarding 612 any URL that points to an image file.

The method can also include steps such as updating, at 614, URL counts, updating, at 616, a count of messages the normalized URL appeared in, updating, at 618, a total email threat protection system score for the normalized URL, updating, at 620, a total IP reputation score for the normalized URL, updating, at 622, a set of customers the normalized URL has appeared in, as well as combinations thereof. Therefore, depending upon the configuration of the system 110, any permutation of steps 614-622 can be included.

In some embodiments, an aggregate number of customers that have received the URL can be counted and reported. The system can also compute aggregate statistics based on data collected on a URL over some selected time period, such as a recent time period. Additional statistics about the URL can also be tracked by the system 110 such as number of hops, geographical routing, and so forth.

As mentioned above, the system 110 can queue URLs for sandboxing and update a local state database with various metrics. Example metrics comprise an indication that the URLs are being sandboxed, an update of the count per domain of URLs being sandboxed, an update of the total count of URLs that have been sandboxed, as well as combinations thereof.

In an example sandboxing method, the method includes queuing, at 624, one or more URLs out to the sandbox environment. After the URLs have been thoroughly scanned for malicious content, by reviewing the linked content at which the URL is pointed, the results of the sandboxing are recorded by the system 110. A URIBL can be updated if URLs are added to the condemned list. The system 110 can also track results for normalized URLs by tracking condemned URLs in their normalized format and place the normalized URL in the URIBL.

Domain information, such as domain reputation databases, can also be updated for URLs that are condemned. In some embodiments, the system updates the URI state in which the sandboxing resulted.

As mentioned above, many methods for including and excluding URLs from a sandboxing analysis have been described. To be sure, individual sandboxing criterion can be applied, such as blacklists, whitelists, scores, and so forth. In other embodiments, permutations of sandboxing criteria can be applied to URLs. Regardless, the methods described herein are directed to advantageously streamline the URL testing/sandboxing process to remove redundant analysis and exclude URLs that are likely to be either malicious or clean. Thus, the URLs that are more likely to be sandboxed by the system 110 are URLs about which little information is known, either by the system 110 or third party resources accessible to the system such as domain reputation resources.

Figure 7:
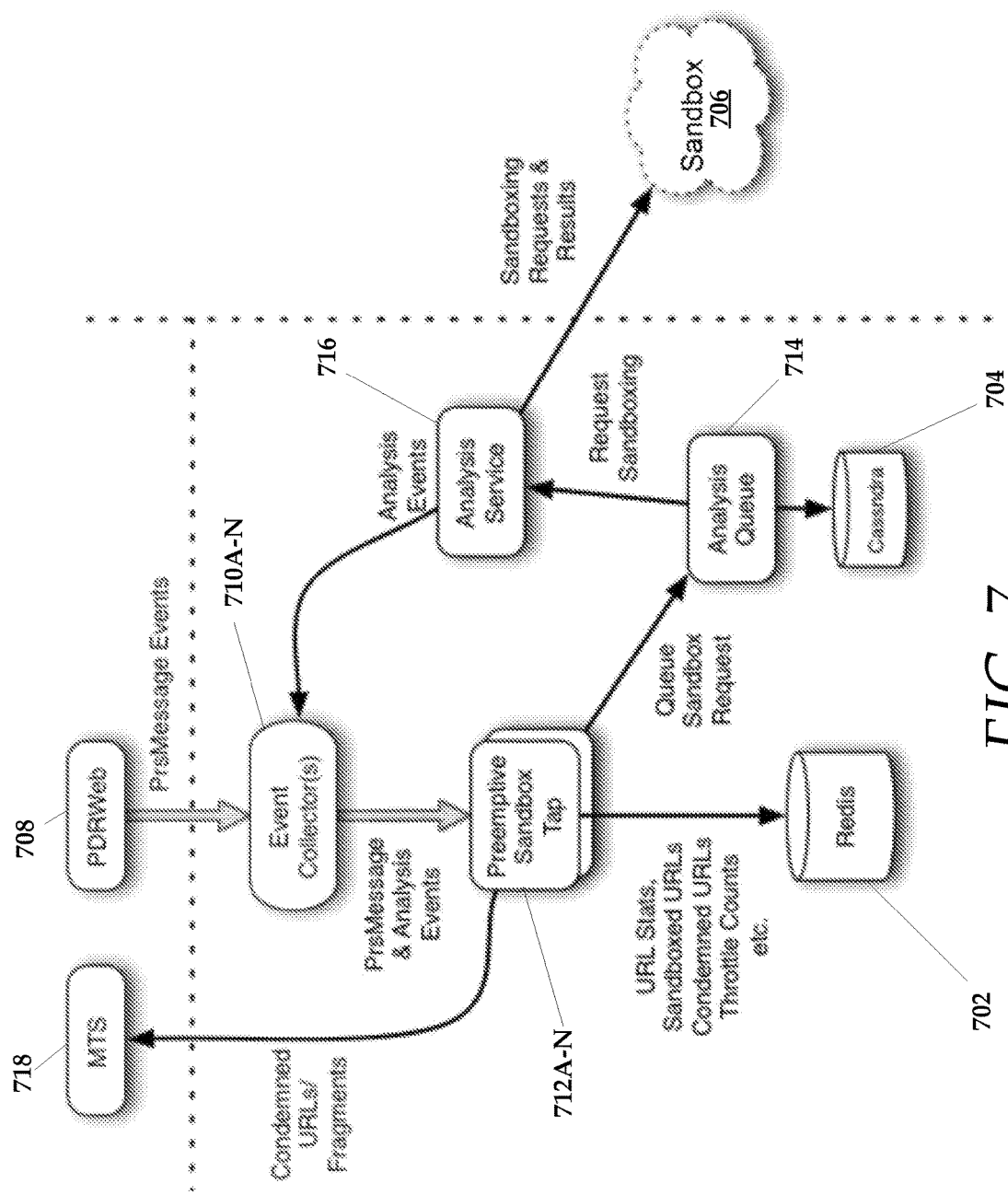
FIG. 7 is a schematic diagram of another example computing environment for practicing aspects of the present technology.

FIG. 7 depicts an example environment that is configured to perform the URL pipeline process discussed above with respect to FIG. 6. The environment can comprise external, third-party database systems such as a data structure server database 702 (e.g., Redis™) and a data structure server database 704 (e.g., Casandra, also referred to as Cassndra herein). A sandbox 706 is also included and may comprise any suitable sandbox system. A web-based system (e.g., PDRWeb, PDR also known as Proofpoint Dynamic Reputation) system 708 may be used to track domain reputation, in some embodiments. Events, collected by the Event Collector(s) 710A-N, may be defined as URLs in messages being tracked by the preemptive sandboxing taps 712A-N, also referred to herein as the system 110. The taps 712A-N can be disposed in any network to intercept or receive emails at various stages of transport, as described above in FIG. 1.

The preemptive sandboxing taps 712A-N are configured to store URL stats, sandboxed URLs identifiers, condemned URLs, throttle counts, and so forth in the data structure server database 702. URLs which are queued for delivery to the sandbox 706 can be queued in an analysis queue 714. The analysis queue can calculate various scores as described infra. These scores can be stored in the data structure server database 704 and URLs can be transmitted to an analysis service 716 prior to transmission to the sandbox 706.

In some embodiments, a preemptive sandboxing tap 712 is also configured to transmit condemned URLs or URL fragments (such as normalized parts of a URL) to an MTS 718 (reputation handling system) or blacklist.

Figure 8:
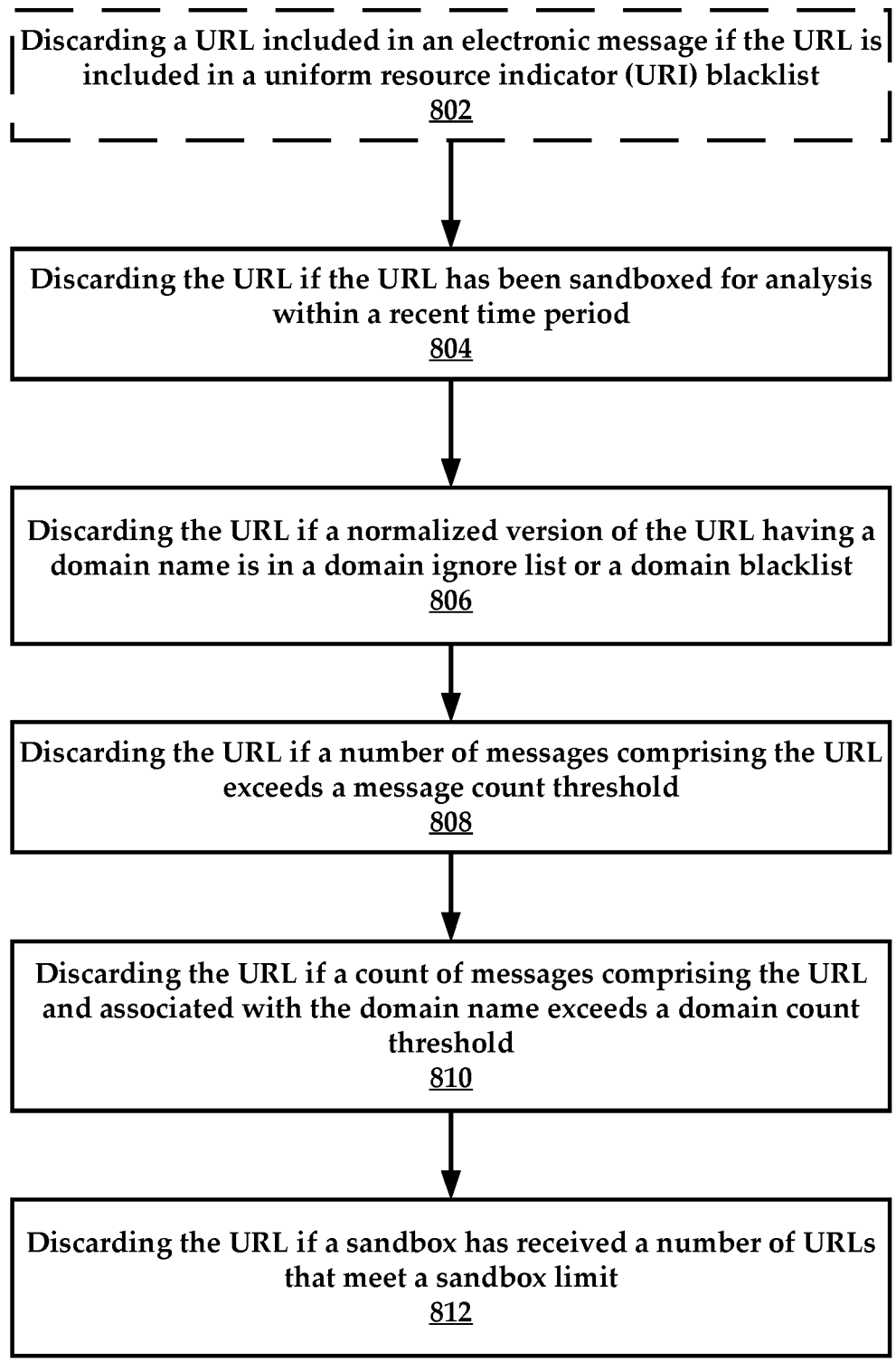
FIG. 8 is a flowchart of an example predictive sandboxing method.

Turning now to FIG. 8, an exemplary method for predictive sandboxing is illustrated. As mentioned above, the various methods for excluding a URL from sandboxing can be combined in various forms depending upon the preferences of email system administrators.

In some embodiments, a method can include combining various pluralities of discarding steps so as to filter URLs from being sandboxed. For example, the method optionally comprises discarding, at 802, a URL included in an electronic message if the URL is included in a uniform resource indicator (URI) blacklist. In various embodiments, the method includes discarding, at 804, the URL if the URL has been sandboxed for analysis within a recent time period and/or discarding, at 806, the URL if a normalized version of the URL having a domain name is in a domain ignore list or a domain blacklist.

The method may further comprise discarding, at 808, the URL if a number of messages comprising the URL exceeds a message count threshold. For example, if a message count threshold is set to 40, and if 50 email messages include the URL, the email messages are preemptively discarded because it is likely that the URL has already been processed for sandboxing.

The method can also comprise discarding, at 810, the URL if a count of messages comprising the URL and associated with the domain name exceeds a domain count threshold. This discarding process can involve the normalization of the URL for more direct domain name analysis.

The method can continue with discarding, at 812, the URL if a sandbox has received a number of URLs that meet a sandbox limit. Thus, the system 110 is configured to ensure that the sandbox does not exceed the sandbox limit, which would potentially monopolize system resources due to analyzing too many URLs at one time.

Figure 9:
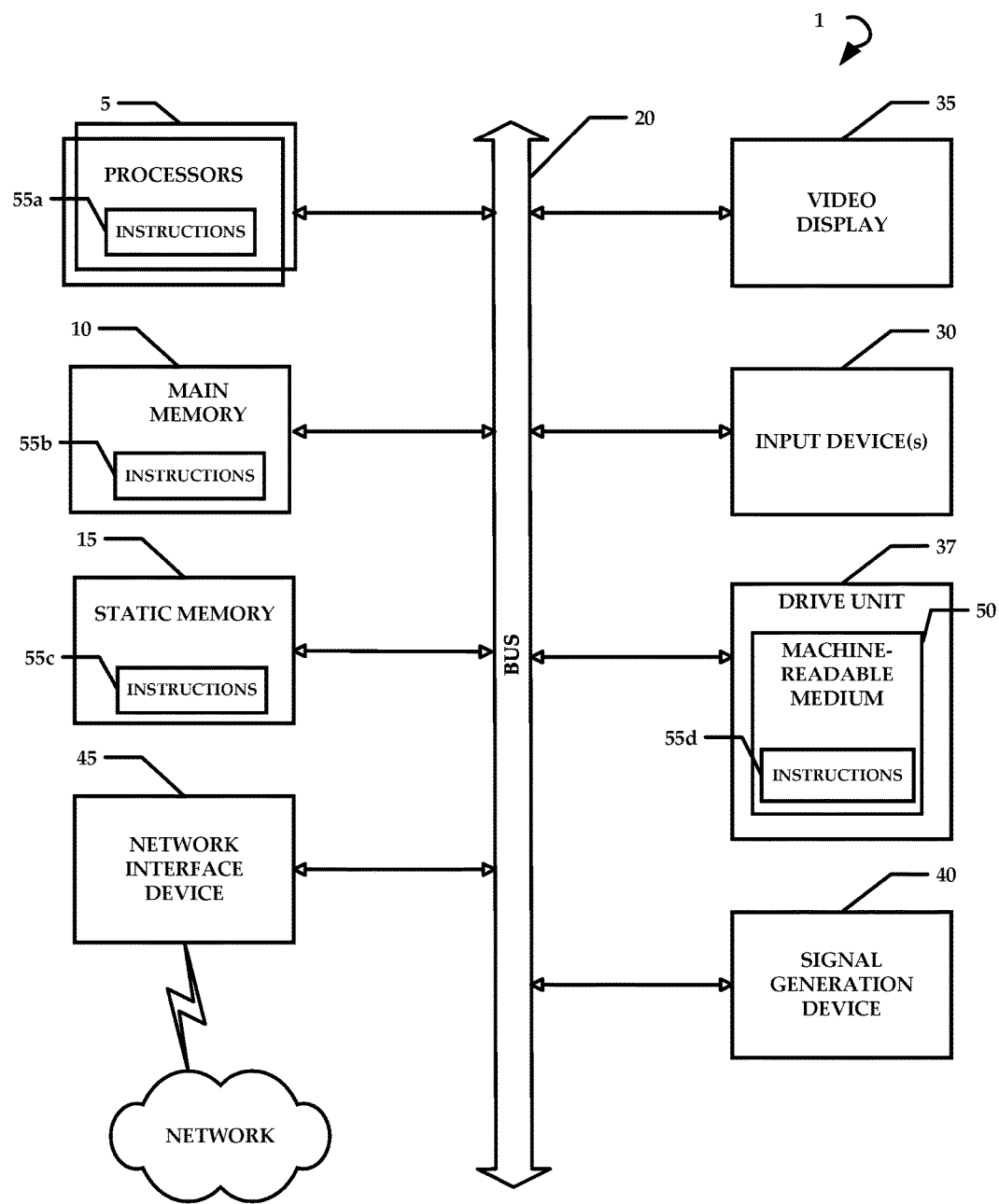
FIG. 9 is a schematic diagram of an example computing system that can be used to practice aspects of the present technology.

FIG. 9 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55$d$) embodying or utilizing any one or more of the methodologies or functions described herein. Instructions 55$a$-$c$ may also reside, completely or at least partially, within the main memory 10, the processors 5, and/or within the static memory during execution thereof by the computer system 1. The main memory 10 and the processors 5 may also constitute machine-readable media.

Instructions 55$a$-$d$ may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as I/O devices.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated. Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment," "an embodiment," or other similar terms means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for protecting users from malicious content by queuing one or more Uniform Resource Locator (URL) links pointing at linked content, the method comprising:
   retrieving, by a hardware processor, a Uniform Resource Locator link pointing at linked content from an electronic message of a user;
   performing a URL validity check before sandboxing and discarding the Uniform Resource Locator link from being sandboxed if the Uniform Resource Locator link is determined to not be a valid Uniform Resource Locator link, so as to avoid sandboxing invalid Uniform Resource Locator links;
   determining if the Uniform Resource Locator link is indicative of an image file, and discarding any Uniform Resource Locator (URL) link that points to an image file; and
   selectively queuing the Uniform Resource Locator link for sandboxing if determined that: (a) the Uniform Resource Locator link is a valid Uniform Resource Locator link, and (b) the Uniform Resource Locator link is not indicative of an image file.

2. The method of claim 1, further comprising:
   determining if the Uniform Resource Locator link has been recently sandboxed for analysis in a recent time period, wherein the recent time period is a configurable recent time period before the Uniform Resource Locator link was retrieved;
   based on the determining, if determined that the Uniform Resource Locator link has been recently sandboxed for analysis in the configurable recent time period, discarding the Uniform Resource Locator link from being sandboxed; and
   selectively queuing the Uniform Resource Locator link for sandboxing if determined that the Uniform Resource Locator link has not been recently sandboxed for analysis in the configurable recent time period.

3. The method of claim 2, wherein the recent time period is configured to be an hour, day, or month before the Uniform Resource Locator link was retrieved.

4. The method of claim 1, further comprising:
discarding the Uniform Resource Locator link from being sandboxed if a number of Uniform Resource Locator links that have been queued exceeds a domain count threshold, the domain count threshold being set per domain name.

5. The method of claim 4, further comprising eliminating the domain count threshold if any of the Uniform Resource Locator links in a sandbox is malicious.

6. The method of claim 4, further comprising reinstituting the domain count threshold for the domain name after a set period of time or after a set number of Uniform Resource Locator links associated with the domain name are found to be non-malicious.

7. The method of claim 1, wherein the selectively queuing the Uniform Resource Locator link for sandboxing comprises filtering the Uniform Resource Locator link, the filtering comprising:
calculating a dynamic reputation score for the Uniform Resource Locator link;
comparing the dynamic reputation score to a predetermined reputation score threshold; and
selectively queuing the Uniform Resource Locator link for sandboxing if the Uniform Resource Locator link has a dynamic reputation score that exceeds the predetermined reputation score threshold.

8. The method of claim 7, the filtering further comprising:
calculating a targeted attack preparation score for the Uniform Resource Locator link;
comparing the targeted attack preparation score to a predetermined targeted attack preparation threshold; and
selectively queuing the Uniform Resource Locator link for sandboxing if the Uniform Resource Locator link has a targeted attack preparation score that exceeds the predetermined targeted attack preparation threshold.

9. The method of claim 1, wherein validity of the Uniform Resource Locator link is determined based at least in part on querying web traffic data ranking websites.

10. The method of claim 1, further comprising discarding the Uniform Resource Locator link from being sandboxed if a sandbox has received a number of Uniform Resource Locator links that meet a predetermined sandbox limit.

11. The method of claim 1, the selectively queuing the Uniform Resource Locator link for sandboxing further comprising:
performing a message tracking procedure for messages that include the Uniform Resource Locator link, the performing comprising counting a number of messages that include the Uniform Resource Locator link; and
selectively queuing the Uniform Resource Locator link for sandboxing if the number of messages exceeds a predetermined message count threshold.

12. The method of claim 11, wherein the counting the number of messages that include the Uniform Resource Locator link comprises storing a message identifier for each of the messages.

13. The method of claim 1, further comprising:
discarding the Uniform Resource Locator link from being sandboxed if the Uniform Resource Locator link is included in a Uniform Resource Indicator (URI) blacklist; and
causing the Uniform Resource Locator link to be placed in the URI blacklist if the Uniform Resource Locator link is found to be malicious, or if an amount of Uniform Resource Locator links associated with a domain name exceeds a predetermined blacklisting threshold.

14. A system for protecting users from malicious content by queuing one or more Uniform Resource Locator (URL) links pointing at linked content, the system comprising:
at least one hardware processor; and
a memory for storing logic, the logic being executed by the at least one hardware processor to execute operations comprising:
retrieving, by the at least one hardware processor, a Uniform Resource Locator link pointing at linked content from an electronic message of a user;
performing a URL validity check before sandboxing and discarding the Uniform Resource Locator link from being sandboxed if the Uniform Resource Locator link is determined to not be a valid Uniform Resource Locator link, so as to avoid sandboxing invalid Uniform Resource Locator links;
determining if the Uniform Resource Locator link is indicative of an image file, and discarding any Uniform Resource Locator (URL) link that points to an image file; and
selectively queuing the Uniform Resource Locator link for sandboxing if determined that: (a) the Uniform Resource Locator link is a valid Uniform Resource Locator link, and (b) the Uniform Resource Locator link is not indicative of an image file.

15. The system of claim 14, wherein the retrieving the Uniform Resource Locator link from the electronic message of the user further comprises normalizing the Uniform Resource Locator link to remove at least one of subdomains, query strings, and anchors.

16. The system of claim 14, the operations further comprising:
discarding the Uniform Resource Locator link from being sandboxed if a number of Uniform Resource Locator links that have been queued exceeds a domain count threshold, the domain count threshold being set per domain name.

17. The system of claim 16, the operations further comprising eliminating the domain count threshold if any of the Uniform Resource Locator links in a sandbox associated with the domain name are malicious.

18. The system of claim 17, the operations further comprising reinstituting the domain count threshold for the domain name after a set period of time or after a set number of Uniform Resource Locator links associated with the domain name are found to be non-malicious.

19. The system of claim 14, the operations further comprising:
determining if the Uniform Resource Locator link has been recently sandboxed for analysis in a recent time period, wherein the recent time period is a configurable recent time period before the Uniform Resource Locator link was retrieved;
based on the determining, if determined that the Uniform Resource Locator link has been recently sandboxed for analysis in the configurable recent time period, discarding the Uniform Resource Locator link from being sandboxed; and
selectively queuing the Uniform Resource Locator link for sandboxing if determined that: the Uniform Resource Locator link has not been recently sandboxed for analysis in the configurable recent time period.

20. The system of claim 19, wherein the recent time period is configured to be an hour, day, or month before the Uniform Resource Locator link was retrieved.

21. A non-transitory computer-readable storage medium having embodied thereon instructions, which, when executed by at least one processor, perform steps of a method, the method comprising:
- retrieving, by a hardware processor, a Uniform Resource Locator link pointing at linked content from an electronic message of a user:
- performing a URL validity check before sandboxing and discarding the Uniform Resource Locator link from being sandboxed if the Uniform Resource Locator link is determined to not be a valid Uniform Resource Locator link, so as to avoid sandboxing invalid Uniform Resource Locator links;
- determining if the Uniform Resource Locator link is indicative of an image file, and discarding any Uniform Resource Locator (URL) link that points to an image file; and
- selectively queuing the Uniform Resource Locator link for sandboxing if determined that: (a) the Uniform Resource Locator link is a valid Uniform Resource Locator link, and (b) the Uniform Resource Locator link is not indicative of an image file.

* * * * *